July 18, 1967 J. C. WOODFORD Re. 26,235

VACUUM BREAKER

Original Filed Feb. 3, 1960 2 Sheets-Sheet 1

INVENTOR
JOSEPH C. WOODFORD
BY Harold E. Sayre
ATTORNEY

VACUUM BREAKER

Original Filed Feb. 3, 1960 2 Sheets-Sheet 2

INVENTOR
JOSEPH C. WOODFORD
BY Howell E. Price
ATTORNEY

United States Patent Office

Re. 26,235
Reissued July 18, 1967

26,235
VACUUM BREAKER

Joseph C. Woodford, 203 N. Buchanan St.,
Spring Lake, Mich. 49456

Original No. 3,155,107, dated Nov. 3, 1964, Ser. No. 6,472, Feb. 3, 1960. Application for reissue Jan. 25, 1966, Ser. No. 526,320
12 Claims. (Cl. 137—218)

Matter enclosed in heavy brackets [ ] appears in the original patent but forms no part of this reissue specification; matter printed in italics indicates the additions made by reissue.

My invention relates to an improvement in valve means for breaking vacuum which may be created under certain abnormal conditions in fluid lines, such as water pipes, to prevent back flow in the fluid line. My improved vacuum breaker and back flow preventing means is particularly adaptable for laboratory use. This application is a continuation-in-part of my application Ser. No. 780,807, filed Dec. 16, 1958, now Patent No. 3,023,767.

One object of my invention is to provide a vacuum breaker assembly which not only includes a vacuum breaker means but also includes an automatic pressure-relief and drain valve which effectively protects the vacuum breaker means.

Another object of my invention is to eliminate the necessity of a near ceiling installation of the vacuum breaker in order to prevent back flow in the event the hose attached to the laboratory faucet is used above the operator's head.

Another object of my invention is to provide a vacuum breaker which will eliminate the danger of cross-over contamination in laboratories by protecting each faucet individually.

Another object of my invention is to provide a vacuum breaker element for laboratory use which includes means affording full protection against flooding of the vacuum breaker with a contaminated liquid, such protective means functioning not only as a check valve but also providing drain apertures which prevent any appreciable pressure being applied to the check valve, and at the same time enables the contaminated system to drain to the outside.

Another object of my invention is to provide a vacuum breaker for laboratory use which includes means to prevent contaminated fluid from "soaking" into, or standing in, the outlet system for periods of time.

Many vacuum breaker devices have been made and sold previously, but none of these prior art devices has satisfied adequately all of the requirements of the authorities of the various states. Moreover, the types of conventional vacuum breakers which are particularly adaptable for laboratory use require that the vacuum breaker be installed in the water line in the vicinity of the ceiling of the room. Not only is such a type of installation expensive to install, but such an installation results in an unsightly condition in the laboratory, or in a beauty parlor, etc. if such a vacuum breaker be installed in such a location.

In addition, such prior art conventional types of vacuum breaker can flood over, or "spit," under certain conditions, as is well known to those skilled in the art.

My invention includes the various novel features of construction and arrangement hereinafter more definitely specified with reference to the accompanying drawings. In said drawings.

Figure 1:
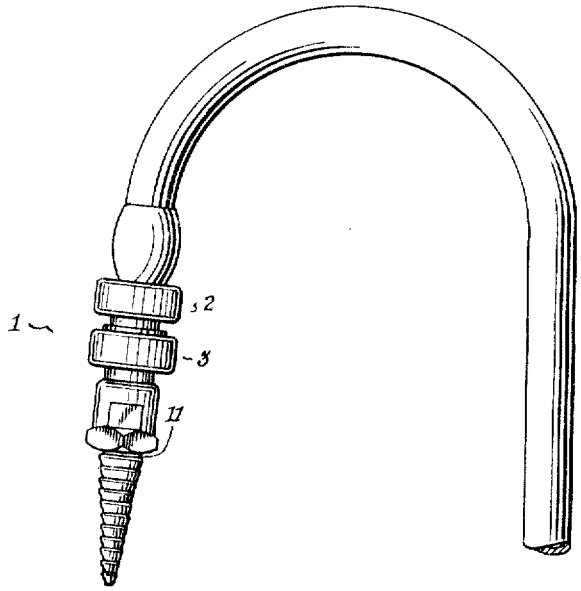
FIG. 1 is a side elevation of my improved vacuum breaker assembly installed on the screw threaded spout of a common and well known type of fixture used in connection with laboratory sinks.

Referring to said drawings; my valve means for breaking vacuum indicated generally at 1, consists of two parts, to wit, the vacuum breaker device per se, indicated generally at 2 and the automatic pressure-relief and drain valve means, indicated generally at 3.

The vacuum breaker device is formed of an inlet member 4 and an outlet cap member 5. The inlet member 4 is provided at its upper end with an external screw thread 6 adapted for engagement with the standard pipe thread at the end of a fixture such as is used commonly for laboratory sinks, for example, or for other devices. The outlet cap member 5 is provided with an internal screw thread 7 adapted to engage the external screw thread 10 formed at the bottom of the inlet member 4.

The vacuum breaker per se 2 is provided with a substantially flat circular diaphragm member 12 made of any suitable flexible and resilient material. The valve member 12 is clamped near its outer periphery between a relatively sharp annular projection 13, formed at the bottom end of the member 4, and an annular seat surface 15 formed at the upper part of the member 5.

The member 4 and the member 5 are tightly screwed together so as to form a water-tight joint around the outer edge of the diaphragm member 12.

The member 4 is provided with a transverse partition 17a forming a substantially flat and smooth valve seat surface 17 which has a series of openings 18 therethrough to permit the flow of water to pass through the member 4. The lower end of the member 4 is provided with an annular groove 20 to allow a space in which any dirt or foreign matter in the water may accumulate in the operation of the vacuum breaker, as hereinafter described.

The member 5 is provided with a circumferential series of air inlets, or vacuum breaking ports, 21 between the diaphragm 12 and the relatively sharp annular seating edge 23 extending toward the diaphragm member 12.

Figure 6:
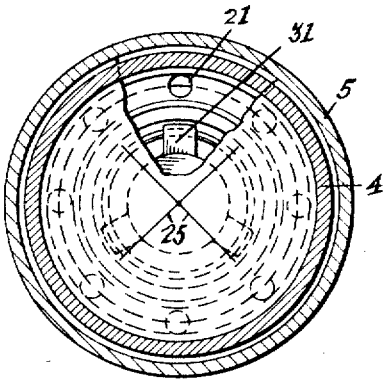
FIG. 6 is a horizontal sectional view, taken on the line 6—6 in FIG. 2.
Figure 7:
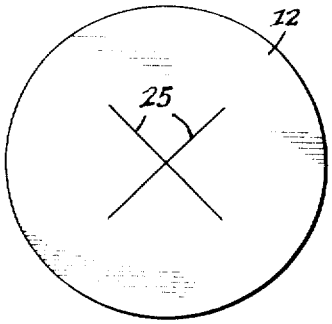
FIG. 7 is a plan view of the diaphragm valve elements of the structure shown in FIGS. 2 and 5.

As shown in FIGS. 6 and 1, the diaphragm member 12 is provided with cross slits 25 therethrough which are of less length than the diameter of the annular seating edge 23. The space between the valve seat 17 and the annular seating edge 23 is sufficient to allow limited movement of the central portion of the diaphragm 12. Accordingly, the diaphragm 12 can seal alternately against the valve seat 17 or the annular seating edge 23, under vacuum condition, or under flow condition, respectively.

Figure 3:
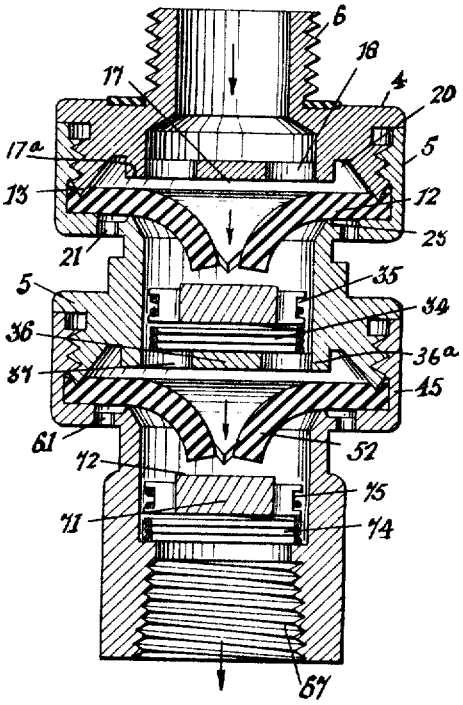
FIG. 3 is an axial vertical sectional view, similar to FIG. 2, but showing the position of the elements when the valve control for the water is open.
Figure 4:
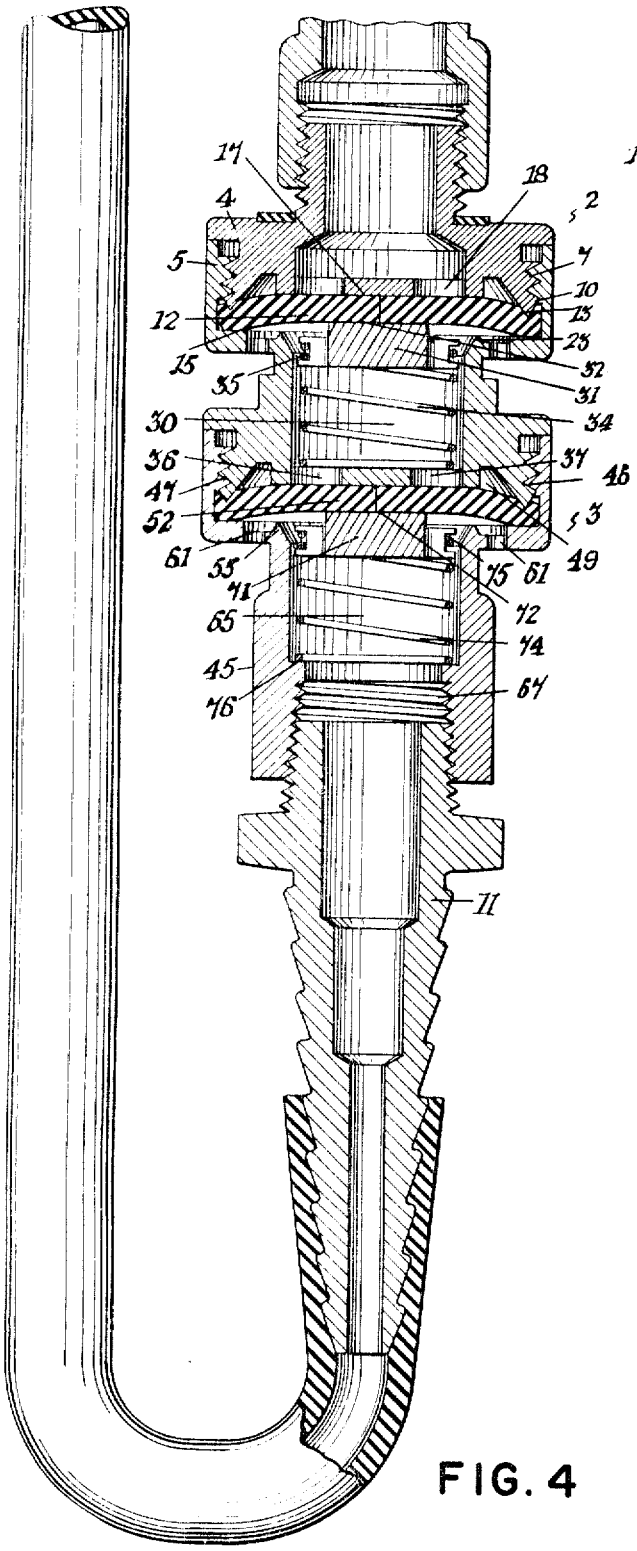
FIG. 4 is an axial vertical sectional view of the vacuum breaker assembly shown in FIGS. 2 and 3, with service tubing attached thereto, showing the position of the elements of the vacuum breaker assembly when a vacuum condition exists in the water supply system.
Figure 5:
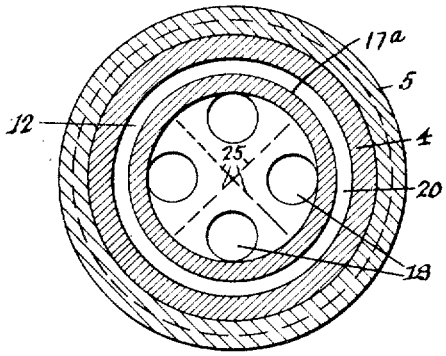
FIG. 5 is a horizontal sectional view, taken on the line 5—5 in FIG. 2.

When water flow is permitted by the opening of the valve controlling the laboratory sink fixture, the diaphragm 12 first seals effectively against the sharp annular seating edge 23, thereby preventing any escape of water through the circumferential series of ports 21. The pressure of the water passing through the openings 18 in the valve seat surface 17 against the slitted portions 25 of the diaphragm 12, deflect the slitted portions 25 in a downward opening direction to permit water to flow through the opened up slitted area of the diaphragm 12, as is shown in FIG. 3.

It is to be noted that the slitted portions 25 are flexed, but not expanded, and, therefore, readily return to their substantially flat, or closed position after the flow of water has been shut off by valve means (not shown) for the piping.

When the inlet of the member 4 is subjected to vacuum, the central portion of the diaphragm 12 moves slightly upwardly, and sealingly seats against the underside of the valve seat 17, and thereby closes the series of ports 18, and, of course, the diaphragm 12 moves away from sealing engagement with the annular seating edge 23.

With the diaphragm 12 moved away from sealing engagement with the seating ring edge 23, communication between the chamber 30 of the member 5 and the series of circumferential ports 21 is effected. Thus, return of any contaminated liquid which might otherwise pass upwardly, as hereinafter described, is prevented by two valve sealing functions: first, by the sealing closure of the slits 25 in the diaphragm valve member 12, and, second, by the closure of the series of openings 18 in the valve seat member 17 by the movement of the upper surface of the diaphragm valve member 12 into sealing engagement with said series of openings 18.

As above described, adequate protection against back flow and contamination of water supply lines under conditions of light annd intermittent use of the water supply lines, is effected. However, I deem it preferably to provide the vacuum breaker with additional means which will assure that the vacuum breaker will function properly even under most severe conditions of maximum flow therethrough for long periods of time.

Figure 2:
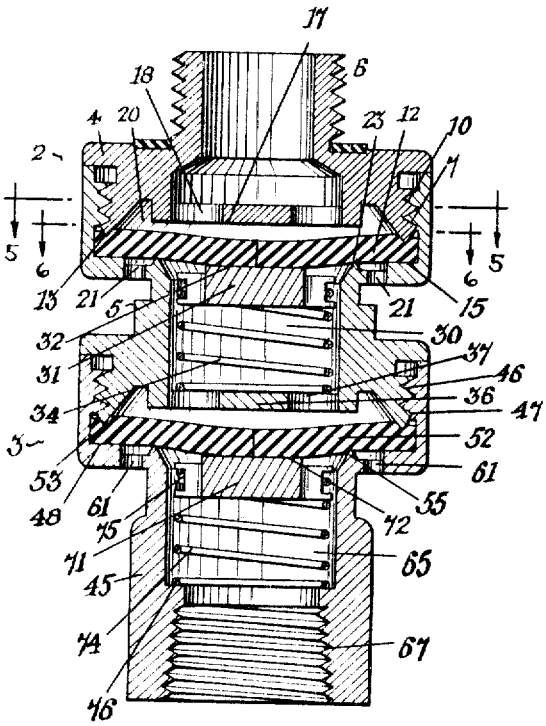
FIG. 2 is an axial vertical sectional view of the vacuum breaker assembly shown in FIG. 1, but on a larger scale, showing the position of the elements when the water has been shut off at the flow control means for the piping.

Referring to FIGS. 2 and 6, a spider like element 31 is provided at its upper surface with a reduced diameter portion 32. The element 31 is continuously stressed upwardly, as in FIG. 2, by means of a coil spring 34, one end of which is engaged in the recesses 35 formed in the periphery of the spider arms of the element 31, and the other end of the spring 34 bears against the upper surface of the valve seat surface 36 formed at the bottom of the member 5. The element 31 and the spring 34 are of such diameter as to be freely movable axially within the chamber 30.

Under conditions of water flow through the hose attached to the fitting 11, the element 31 is pushed downwardly, as in FIG. 2, by the flexing of the slitted portions of the diaphragm 12. The forces of the spring 34 are such that they may be readily overcome by movement of the slitted portions of the diaphragm 12 when opened by the water pressure. With the element 31 moved downwardly by the flexed slitted segments 25 of the diaphragm 12 under water pressure to cause an opening through the diaphragm 12, the water pressure itself moves the element 31 further downwardly, as in FIG. 2, to a position wherein the spring 34 and the element 31 are moved to their lowest possible position within the chamber 30, as is indicated in FIG. 3.

The element 31 being of a spider construction, as indicated in FIG. 6, with a reduced diameter central portion 32, water may flow freely through the spaces between the legs of the spider and thence through the series of circumferential openings 37 formed in a transverse position 36[a] forming a valve seat surface 36.

When the flow of water is shut off, the slitted portions of the resilient diaphragm member 12 tend to return to their substantially plane position, and the spring pressed member 31 follows the diaphragm 12 and assists in repositioning the slitted portion 25 of the diaphragm 12 into valve closed position. It is to be noted that during long periods of non-use of water through the vacuum breaker, the element 31 and its spring 34 acts as a supporting member for the diaphragm 12, and prevents any tendency of the segments, produced by the slits 21, to sag or fatigue out of their normal plane valve closed positions. Under conditions of vacuum within the supply line, when the ports 18 are closed by the diaphragm 12 and with the diaphragm slits in closed position, the element 31 provides a third valve seal against the slitted under surface of the diaphragm 12.

It is highly improbable that particles of foreign matter entrained in the water would render all three sealing means of the vacuum breaker per se, as described above, inoperative and non-functioning. Moreover, due to the assistance of the spring element 31, the slitted portions 25 of the diaphragm 12 are retained in proper position, even under the most severe conditions of use. It is to be noted that severe conditions of use have caused distortion of resilient elements in, and the failure of, prior art vacuum breaker constructions.

The automatic pressure-relief and drain valve means of the assembly includes a substantially flat circular diaphragm valve member 52, similar to the diaphragm member 12, and which diaphragm member 52 is made of any suitable flexible and resilient material. The valve member 52 is clamped near its outer periphery between a relatively sharp annular projection 53 formed at the bottom of the member 5 and an annular seat surface 48 formed at the upper part of the member 45.

The member 5 is provided with an external screw thread 46 at its lower end, and the member 45 is provided at its upper end with an internal screw thread 47. The member 5 and the member 45 are tightly screwed together so as to form a water-tight joint around the other edge of the valve member 52. The lower end of the member 5 is provided with an annular groove 49 to allow a space in which any dirt or foreign matter may accumulate in the operation of the valve member 52, as hereinafter described.

The member 45 is provided with a circumferential series of air inlets, or ports, 61 between the diaphragm 52 and the relatively sharp annular seating edge 55 extending toward the diaphragm member 52. The diaphragm member 52 is provided with cross slits therethrough similar to the cross slits 25 in the diaphragm member 12, and which cross slits are of less length than the diameter of the annular seating edge 55. The space between the valve seat surface 36 and the annular seating edge 55 is sufficient to allow limited movement of the central portion of the diaphragm 52. Accordingly, the diaphragm 52 can seal alternately against the valve seat 36 or the annular seating edge 55 under vacuum condition, or flow condition, respectively.

When water flow is permitted by opening of the valve controlling the laboratory sink fixture, and the diaphragm 12 of the vacuum breaker means per se has moved to open position, as heretofore described, the diaphragm valve member 52 first seals effectively against the sharp annular seating edge 55, thereby preventing any escape of water through the circumferential series of ports 61. The pressure of water passing through the openings 37 in the valve seat surface 36 of the member 5 against the slitted portions of the diaphragm valve member 52 in a downward opening direction permits water to flow through the opened slitted area of the diaphragm 52, as shown in FIG. 3 and thence through the chamber 65 to the internally screw threaded outlet lower end 67 of the member 45. The screw threaded lower end of the member 45 is adapted to receive the screw threaded end of a hose adaptor member, such as indicated at 11 in FIG. 1.

The slitted portions of the diaphragm member 52 are flexed, but not expanded, and, therefore, readily return to their substantially flat, or closed, position after the water has been shut off by valve means in the piping connected to the laboratory fitting.

When the inlet portion of the member 4 is subjected to vacuum, the central portion of the diaphragm valve member 52 moves slightly upwardly, and sealingly seats against the underside of the valve seat 36, and thereby closes the series of ports 37 and, of course, the diaphragm 52 moves away from sealing engagement with the annular seating edge 55. When the diaphragm 52 moves away from sealing engagement with the seating ring edge 55, communication between the chamber 65 of the member 45 and the series of circumferential ports 61 is effected.

Accordingly, the automatic pressure-relief and drain valve means assures that the vacuum breaker means per se, including the diaphragm 12 and the chamber 30, is fully protected against flooding by returning contaminated liquid which could stand and "soak" in the outlet system for long periods.

When the inlet portion of the member 4 is subjected to vacuum, both diaphragms 12 and 52 sealingly seat against their respective valve seats, and any contaminated water or any contaminated liquid drains to the outside through the openings 61.

Experiments have proven that a simple check valve is not effective as a substitute for my improved automatic pressure-relief and drain valve construction, including the diaphragm 52, because it has been found to be almost certain that dirt or chips, pipe scale, etc. sooner or later foul the operation of a simple check valve sufficiently to allow the upper vacuum breaker means per se to be flooded by returning contaminated liquid, and thus defeat the whole purpose of protection to be provided by the vacuum breaker means.

To assure that the automatic pressure-relief and drain valve of the vacuum breaker assembly will function properly even under the most severe conditions of maximum flow for a long period of time, I find it desirable to include a spider like element 71, similar to the element 31, and similarly provided at its upper surface with a reduced diameter portion 72. The element 71 is continually stressed upwardly, as in FIG. 2, by means of a coil spring 74, one end of which is engaged in the recesses 75 formed in the periphery of the spider arms of the element 71 and the other end of the spring 74 bears against an offset 76 formed at the bottom of the member 45. The element 71 and the spring 74 are of such diameter as to be freely movable within the chamber 65.

Under conditions of water flow through the piping, the element 71 is pushed downwardly, as in FIG. 2, by the flexing of the slitted segment portions of the diaphragm 52. The forces of the spring 74 are such that they may be readily overcome by movement of the slitted portions of the diaphragm 52 when opened by the water pressure. The element 71 is moved downwardly by the slitted segments of the diaphragm 52 under water pressure to cause an opening through the diaphragm 52, as in FIG. 3, to a position wherein the spring 74 and the element 71 are moved to their lowest possible position within the chamber 65, as is indicated in FIG. 3. The element 71 being of a spider construction, water may flow freely through the spaces between the legs of the spider and to and through the outlet 67 formed at the lowermost end of the member 45.

When the flow of water is shut off, the slitted portions of the diaphragm valve member 52 tend to return to their substantial position and the spring pressed member 71 follows the diaphragm 52 and assists in repositioning the slitted portions of the diaphragm 52 into valve closed position. During long periods of non-use of water through my improved vacuum breaker assembly, the element 71 and its spring 74 act as a supporting member for the diaphragm 52 and prevents any tendency of the segments, produced by the slits, to sag or fatigue out of their normal plane valve closed positions. Under condition of vacuum within the supply line, the element 71 provides an additional seal against the slitted under surface of the diaphragm valve member 52.

I do not desire to limit myself to the precise details of construction and arrangement as herein set forth, as it is obvious that various modifications may be made therein without departing from the essential features of my invention, as defined in the appended claims.

I claim:

1. A vacuum breaker and back flow prevention means comprising an inlet body member; a hollow chamber formed in said body member; a transverse substantially plane web-like partition formed in said hollow chamber, said web-like partition having a valve surface at its underside, and having a flow port therethrough; an outlet body member provided with an outlet opening; a hollow chamber formed in said outlet member; an annular seating edge formed at the top portion of said hollow chamber of said outlet member, said annular seating edge projecting toward the valve surface of said transverse web-like partition of said inlet body member; a [multiplicity of] vent port[s] surrounding said annular seating edge, said vent port[s] affording communication between said hollow chamber of said outlet member and atmosphere; a flexible resilient substantially plane diaphragm member clamped at its periphery between said inlet body member and said outlet body member, the central portion of said diaphragm member having limited freedom of motion between the valve surface of siad transverse web-like partition of said inlet body member and the annular seating edge of said outlet body member; port means through said diaphragm member at its central portion to permit liquid to flow through said diaphragm member under inlet pressure; an axially removable spring pressed combination diaphragm port closing and diaphragm support member positioned in said hollow chamber formed in said outlet member; an automatic [pressure-relief and drain] valve means connected to said outlet opening of said outlet body member, said [pressure-relief and drain] valve means comprising a transverse substantially plane web-like partition formed at the bottom of said outlet opening of said outlet body member, said web-like partition having a flow port therethrough and a valve surface at its underside; a body member; a flexible resilient substantially plane [pressure-relief] [and drain] valve diaphragm member clamped at its outer periphery between the lower end of said outlet body member and a seat formed in the upper part of said body member of said [pressure-relief and drain] valve means; a[n annular] seat[ing edge] formed at the top portion of said body member of said [pressure-relief and drain] valve means, [said annular seating edge projecting toward said valve surface of said web-like partition formed at the bottom of said outlet opening of said outlet body member; a multiplicity of vent ports surrounding said last mentioned annular seating edge, said last mentioned vent ports affording communication between atmosphere and a hollow outlet chamber formed in the lower part of said body member of said pressure-relief and drain valve means;] self closing port means through said diaphragm of said [pressure-relief and drain] valve means, said self closing port[s] being adapted to open under inlet liquid pressure to permit liquid to flow through said last mentioned freedom of motion between its [annular] seat[ing] [surface] and its valve surface at the underside of said web-like partition formed at the bottom of said outlet opening of said outlet body member.

2. A structure as in claim 1; wherein the self closing ports of said diaphragm member of said [pressure-relief] [and drain] valve means are formed by cross slits through said diaphragm member at its central portion to enable the segments formed by the slits to be moved to open position to form a flow port when subjected to inlet liquid pressure.

3. A structure as in claim 1; including an axial movable spring pressed combination diaphragm flow port closing and diaphragm support member positioned in said outlet chamber formed in the lower part of said body member of said [pressure-relief and drain] valve means.

4. A structure as in claim 1; wherein the self closing ports of said diaphragm member of said [pressure-relief] [and drain] valve means are formed by cross slits through said diaphragm member at its central portion to enable the segments formed by the slits to be moved to open position to form a flow port when subjected to inlet liquid pressure; and wherein an axially movable spring pressed combination diaphragm flow port closing and diaphragm support member is positioned in said outlet chamber formed in the lower part of said body member of said pressure-relief and drain valve means.

5. A vacuum breaker and back flow prevention means comprising a body member provided with an inlet port and an outlet port; a first hollow chamber formed in said body member toward said inlet port; a second hollow chamber formed in said body member toward said outlet port; an annular seating edge formed at the top of said second hollow chamber, said annular seating edge projecting toward said first hollow chamber; a multiplicity of vent ports surrounding said annular seating edge and affording communication between said second hollow chamber and atmosphere; a circular transverse member in said first hollow chamber, said transverse member being sealed to prevent liquid flow at its periphery, the central portion of said transverse member having limited freedom of motion between said inlet port and said annular seating edge; port means through said transverse member at its central portion to permit liquid to flow through said transverse member under inlet pressure; a movable spring pressed flow port closing member positioned in said secone hollow chamber; a[n automatic pressure-relief and] [drain] valve means connected to said outlet of said body member, said [pressure-relief and drain] valve means comprising a body member provided with an inlet port and an outlet port; a hollow chamber formed in said [pressure-] [relief and drain] valve means body member; an annular seating edge formed at the top of said hollow chamber formed in said [pressure-relief and drain] valve means; [a multiplicity of vent ports surrounding said annular seating edge of said pressure-relief and drain valve means, said vent ports affording communication between said hollow chamber formed in said pressure-relief and drain valve means body member and atmosphere;] a circular transverse member in said hollow chamber of said [pressure] [relief and drain] valve means, said transverse member being sealed to prevent liquid flow at its periphery, the central portion of said transverse member having limited freedom of motion between the annular seating edge of said [pressure-relief and drain] valve means and the outlet port of said first named body member; port means through the central portion of said transverse member of said [pressure-relief and drain] valve means to permit liquid to flow through said transverse member under inlet pressure; and a movable spring pressed flow port closing member positioned in said hollow chamber of said [pressure-relief] [and drain] valve means body member.

6. A valve of the character described, comprising:

(a) an outer housing having an inlet opening and an outlet opening;

(b) said housing having a plurality of longitudinally aligned hollow cylindrical sections;

(c) a transverse partition forming a flat valve seat surface within each of said sections, each said transverse partition having a flow port therethrough;

(d) a circular transverse relatively sharp valve seat within each of said sections, each of said relatively sharp valve seats being spaced apart from and extending toward the outlet side of a transverse partition forming a flat valve seat surface;

(e) a circular transverse valve member located between each of said transverse relatively sharp valve seats and a said transverse partition forming a flat valve seat surface, said circular transverse valve members being sealed to prevent liquid flow at their respective peripheries;

(f) the central portion of each of said circular transverse valve members having limited freedom of motion between its said transverse partition forming a flat valve seat surface and its said circular transverse relatively sharp valve seat;

(g) port means through said circular transverse valve members at their respective central portions, to permit liquid to flow through said circular transverse valve members under inlet pressure;

(h) a movable spring pressed flow port closing member on the outlet side of each circular transverse valve member;

(i) and a plurality of ports surrounding each of said circular transverse relatively sharp valve seats, said plurality of ports affording communication between the outlet side of each circular transverse valve member and atmosphere when said circular transverse valve members are moved off their respective circular transverse relatively sharp valve seats.

7. A valve of the character described, comprising:

(a) an outer housing having an inlet opening and an outlet opening;

(b) said housing having a plurality of longitudinally aligned hollow cylindrical sections;

(c) a transverse partition forming a flat valve seat surface within each of said sections, each said transverse partition having a flow port therethrough;

(d) a circular transverse relatively sharp valve seat within each of said sections, each of said relatively sharp valve seats being spaced apart from and extending toward the outlet side of a transverse partition forming a flat valve seat surface;

(e) a flexible resilient substantially plane diaphragm member located between each of said transverse relatively sharp valve seats and a said transverse partition forming a flat valve seat surface, said flexible resilient substantially plane diaphragm members being sealed to prevent liquid flow at their respective peripheries;

(f) the central portion of each of said flexible resilient substantially plane diaphragm members having limited freedom of motion between its said transverse partition forming a flat valve seat surface and its said circular transverse relatively sharp valve seat;

(g) port means through said flexible resilient substantially plane diaphragm members at their respective central portions, to permit liquid to flow through said flexible resilient substantially plane diaphragm members under inlet pressure;

(h) a moveable spring pressed flow port closing member on the outlet side of each flexible resilient substantially plane diaphragm member;

(i) and a plurality of ports surrounding each of said circular transverse relatively sharp valve seats, said plurality of ports affording communication between the outlet side of each flexible resilient substantially plane diaphragm member and atmosphere when said flexible resilient substantially plane diaphragm members are moved off their respective circular transverse relatively sharp valve seats.

8. A valve of the character described, comprising:

(a) an outer housing having an inlet opening and an outlet opening;

(b) said housing having a plurality of longitudinally aligned hollow cylindrical sections;

(c) a transverse partition forming a flat valve seat surface within each of said sections, each said transverse partition having a flow port therethrough;

(d) a circular transverse relatively sharp valve seat within each of said sections, each of said relatively sharp valve seats being spaced apart from and extending toward the outlet side of a transverse partition forming a flat valve seat surface;

(e) a flexible resilient substantially plane diaphragm member located between each of said transverse relatively sharp valve seats and a said transverse partition forming a flat valve seat surface, said flexible resilient substantially plane diaphragm members being sealed to prevent liquid flow at their respective peripheries;

(f) the central portion of each of said flexible resilient substantially plane diaphragm members having limited freedom of motion between its said transverse partition forming a flat valve seat surface and its said circular transverse relatively sharp valve seat;

(g) cross slits through said flexible resilient substantially plane diaphragm members at their respective central portions, to enable the segments formed by said slits to be moved to open position when subjected to inlet pressure;

(h) and a plurality of ports surrounding each of said circular transverse relatively sharp valve seats, said plurality of ports affording communication between the outlet side of each flexible resilient substantially plane diaphragm member and atmosphere when said flexible resilient substantially plane diaphragm members are moved off their respective circular transverse relatively sharp valve seats.

9. A valve of the character described, comprising:

(a) an outer housing having an inlet opening and an outlet opening;

(b) said housing having a plurality of longitudinally aligned hollow cylindrical sections;

(c) a transverse partition forming a flat valve seat surface within each of said sections, each said transverse partition having a flow port therethrough;

(d) a circular transverse relatively sharp valve seat within each of said sections, each of said relatively sharp valve seats being spaced apart from and extending toward the outlet side of a transverse partition forming a flat valve seat surface;

(e) a flexible resilient substantially plane diaphragm member located between each of said transverse relatively sharp valve seats and a said transverse partition forming a flat valve seat surface, said flexible resilient substantially plane diaphragm members being sealed to prevent liquid flow at their respective peripheries;

(f) the central portion of each of said flexible resilient substantially plane diaphragm members having limited freedom of motion between its said transverse partition forming a flat valve seat surface and its said circular transversely relatively sharp valve seat;

(g) cross slits through said flexible resilient substantially plane diaphragm members at their respective central portions, to enable the segments formed by said slits to be moved to open position when subjected to inlet pressure;

(h) a moveable spring pressed flow port closing member on the outlet side of each circular transverse valve member;

(i) and a plurality of ports surrounding each of said circular transverse relatively sharp valve seats, said plurality of ports affording communication between the outlet side of each flexible resilient substantially plane diaphragm member and atmosphere when said flexible resilient substantially plane diaphragm members are moved off their respective circular transverse relatively sharp valve seats.

10. A valve of the character described, comprising:

(a) an outer housing having an inlet opening and an outlet opening;

(b) said housing having a plurality of longitudinally aligned hollow cylindrical sections;

(c) a transverse partition forming a flat valve seat surface within each of said sections, each said transverse partition having a flow port therethrough;

(d) a circular transverse valve seat within each of said sections, each of said circular transverse valve seats being spaced apart from and extending toward the outlet side of a transverse partition forming a flat valve seat surface;

(e) a circular transverse valve member located between each of said circular transverse valve seats and a said transverse partition forming a flat valve seat surface, said circular transverse valve members being sealed to prevent liquid flow at their respective peripheries;

(f) the central portion of each of said circular transverse valve members having limited freedom of motion between its said transverse partition forming a flat valve seat surface and its said circular transverse valve seat;

(g) port means through said circular transverse valve members at their respective central portions, to permit liquid to flow through said circular transverse valve members under inlet pressure;

(h) a moveable spring pressed flow port closing member on the outlet side of each circular transverse valve member;

(i) and a plurality of ports surrounding each of said circular transverse valve seats, said plurality of ports affording communication between the outlet side of each circular transverse valve member and atmosphere when said circular transverse valve members are moved off their respective circular transverse valve seats.

*11. A valve of the character described, comprising: valve housing means provided with an inlet opening and an outlet opening, said housing means having a hollow portion between the inlet and outlet openings, a transverse valve seat spaced from and facing the outlet side of said inlet opening, valve means having an opening disposed between said valve seat and said inlet opening, the opening of the valve means being completely withdrawn from the plane of said valve seat during vacuum conditions, said valve means having a first portion thereof adapted to engage said valve seat, said valve means having a second portion thereof sealed with respect to the housing means to prevent liquid flow at the periphery thereof, said valve means permitting liquid flow therethrough under inlet pressure and preventing back flow therethrough, a port located adjacent said valve seat affording communication between the outlet side of the valve means and atmosphere when said first portion of said valve means is moved off of the valve seat, and a self-closing back flow preventing valve spaced from said valve means to prevent back flow into said hollow portion between the valve means and the self-closing back flow preventing valve, the hollow portion of the housing between the valves providing a vented area wherein pressure differences will not be augmented to foster fluid transfer and providing an air space adjacent said opening of said valve means to prevent fluid contact in the hollow portion with the outlet side of said valve means.*

*12. The valve of claim 11 wherein the valve means includes a diaphragm having an opening and wherein a resilient biasing means is disposed in engagement with the outlet side of the diaphragm and biases the diaphragm into a normally closed position.*

References Cited

The following references, cited by the Examiner, are of record in the patented file of this patent or the original patent.

UNITED STATES PATENTS

| | | | |
|---|---|---|---|
| 1,978,507 | 10/1934 | Rand | 4—211 |
| 2,322,631 | 6/1943 | Groeniger | 137—218 |
| 2,646,063 | 7/1953 | Hayes | 137—218 |
| 2,739,613 | 3/1956 | Kulikoff | 251—359 X |
| 2,758,609 | 8/1956 | Dickert et al. | 137—525 |
| 2,897,835 | 8/1959 | Philippe | 137—218 |
| 2,997,054 | 8/1961 | Woodford | 137—218 |
| 3,023,767 | 3/1962 | Woodford | 137—218 |

WILLIAM F. O'DEA, *Primary Examiner.*

D. LAMBERT, *Assistant Examiner.*

UNITED STATES PATENT OFFICE

CERTIFICATE OF CORRECTION

Reissue No. 26,235 July 18, 1967

Joseph C. Woodford

It is certified that error appears in the above identified patent and that said Letters Patent are hereby corrected as shown below:

Column 6, line 55, after "mentioned" insert -- diaphragm, the central portion of which having limited --.

Signed and sealed this 7th day of April 1970.

(SEAL)
Attest:

Edward M. Fletcher, Jr.
Attesting Officer

WILLIAM E. SCHUYLER, JR.
Commissioner of Patents